United States Patent
Hawkins et al.

[11] Patent Number: 5,389,989
[45] Date of Patent: Feb. 14, 1995

[54] CAMERA FOR RECORDING DIGITAL AND PICTORIAL IMAGES ON PHOTOGRAPHIC FILM

[75] Inventors: Gilbert A. Hawkins, Mendon; Jose M. Mir, Rochester, both of N.Y.

[73] Assignee: Eastman Kodak Company, Rochester, N.Y.

[21] Appl. No.: 146,347

[22] Filed: Oct. 29, 1993

[51] Int. Cl.⁶ .............................................. G03B 17/24
[52] U.S. Cl. .................................................... 354/106
[58] Field of Search ........................ 354/105, 106, 76; 358/909

[56] References Cited

U.S. PATENT DOCUMENTS

| | | | |
|---|---|---|---|
| 3,920,862 | 11/1975 | Damschroder et al. | 427/131 |
| 4,449,805 | 5/1984 | Sakurada et al. | 354/105 |
| 4,797,609 | 1/1989 | Yang | 324/158 D |
| 4,905,029 | 2/1990 | Kelley | 354/76 |
| 4,983,996 | 1/1991 | Kinoshita | 354/76 |
| 5,128,700 | 7/1992 | Inoue et al. | 354/76 |
| 5,128,702 | 7/1992 | Ogawa et al. | 354/106 |
| 5,221,939 | 6/1993 | Taniguchi et al. | 354/173.1 |
| 5,247,574 | 9/1993 | Okuno et al. | 385/17 |
| 5,264,683 | 11/1993 | Yoshikawa | 235/375 |
| 5,276,472 | 1/1994 | Bell et al. | 354/76 |

*Primary Examiner*—Michael L. Gellner
*Assistant Examiner*—Nicholas T. Tuccillo
*Attorney, Agent, or Firm*—Raymond L. Owens

[57] ABSTRACT

A photographic camera system is disclosed in which LEDs are used to record different gray levels or colored information on the film and an optical image of a subject is also recorded on the film.

18 Claims, 7 Drawing Sheets

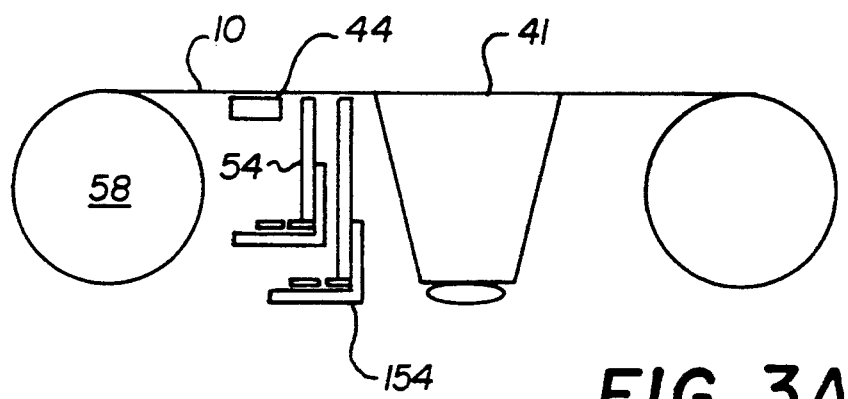
FIG. 3A
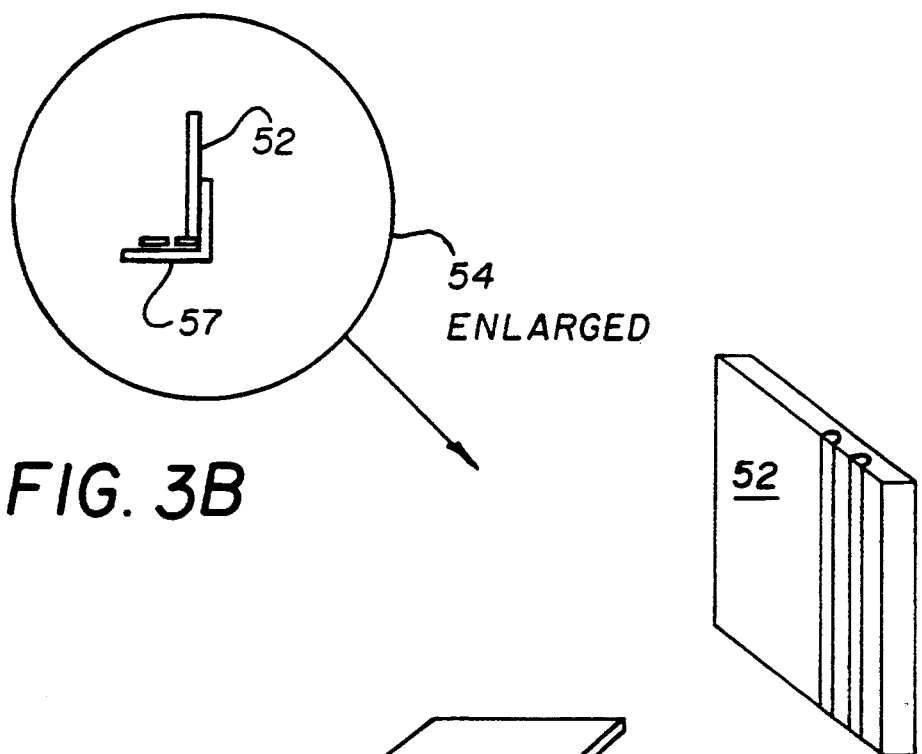
FIG. 3B
FIG. 3C

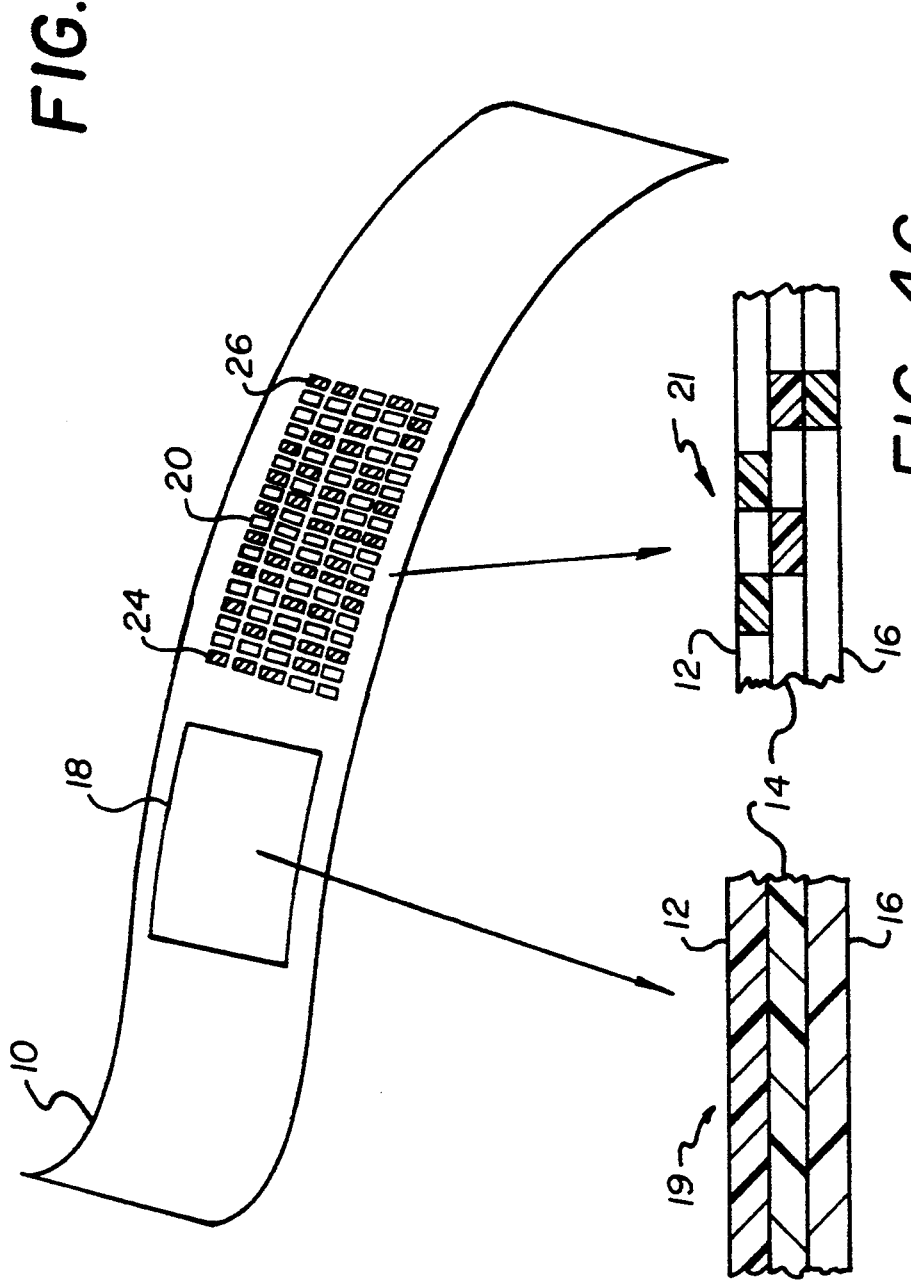

CAMERA FOR RECORDING DIGITAL AND PICTORIAL IMAGES ON PHOTOGRAPHIC FILM

FIELD OF THE INVENTION

The present invention relates to cameras for recording digital and pictorial images.

BACKGROUND OF THE INVENTION

Still camera users frequently desire to enhance or document individual pictures, with supplementary information, such as captions or brief audio segments that can be conveniently accessed during viewing of the image. The need for audio segments has been previously recognized, for example, in U.S. Pat. No. 3,920,862 which teaches a method of recording sound magnetically in association with still pictures. Nonetheless, such camera systems are not in common use today, owing to the fact that most methods suffer disadvantages due to cumbersome peripheral recording devices, specialized data storage systems, and/or cumbersome playback systems, and to the difficulty of synchronizing these functions with image display (see for example U.S. Pat. No. 5,128,700). Recording of sound directly on film eliminates the need for separate storage means but may require specialized film layers, such as magnetic layers. Also, previous camera systems have been restrictive in the type of non-pictorial information recorded and presented upon viewing, being aimed primarily at sound or at simple bar code frame identification and not utilizing the full color spectral imaging capability of films. The information density so recorded is typically very low.

SUMMARY OF THE INVENTION

In view of the foregoing discussion, it is an object of this invention to provide a camera system which expands on the amount and type of non-pictorial information which is available to and which by may be captured by photographic camera users.

Another object is to provide the camera user with the option of using any proportion of film space for the purpose of non-pictorial information recording; to apprise the user of the amount and type of information he has chosen for recording, and the percentage of film occupied by this information, and to enable enhanced modes of non-pictorial information display.

It is a further object of this invention to provide camera users with a way to trade "picture space" on film for non-pictorial information space (for example extended audio narration, text, numerical tables, etc.) without requiring costly and cumbersome hardware additions such as, for example, the tape recorders and players that have been previously employed with cameras to record audio.

These objects are achieved in a photographic camera system for recording images of a subject in a first location on a photographic film, the improvement comprising:

a) means for advancing the film;
b) optical recording means disposed in proximity to the camera exposure gate including a plurality of selectively activated light emitters and waveguide means for conducting light from the emitters to the film as the film is advanced by the film advancing means so that digital information such as digital audio information is recorded in a second location on the film spaced from the first location; and
c) means for optically projecting an image of a subject onto the film to record such image in the first location.

An advantage of this invention is to enable users to choose from a variety of non-pictorial information sources.

A camera system in accordance with this invention affords a user control over the spatial location and data encoding method of the digital information recorded and does not require the use of specialized photographic films.

The present invention minimizes required camera-associated peripheral equipment while still allowing for use of optional peripheral equipment for specialized information recording.

The present invention permits a standardized format for in-camera digital information acquisition. The enhanced features are transparent to users practicing only conventional photography.

BRIEF DESCRIPTION OF THE DRAWINGS

FIGS. 3a, 3b and 3c show a structure for optically recording digital data using a plurality of selectively activated light emitters and a waveguide for conducting light from the emitters to the film strip, with certain portions of this structure also shown in an expanded format;

FIGS. 4a, 4b and 4c show a film strip exposed in accordance with this invention along with two cross-section regions 19 and 21 of the film strip;

DESCRIPTION OF THE PREFERRED EMBODIMENTS

Figure 1:
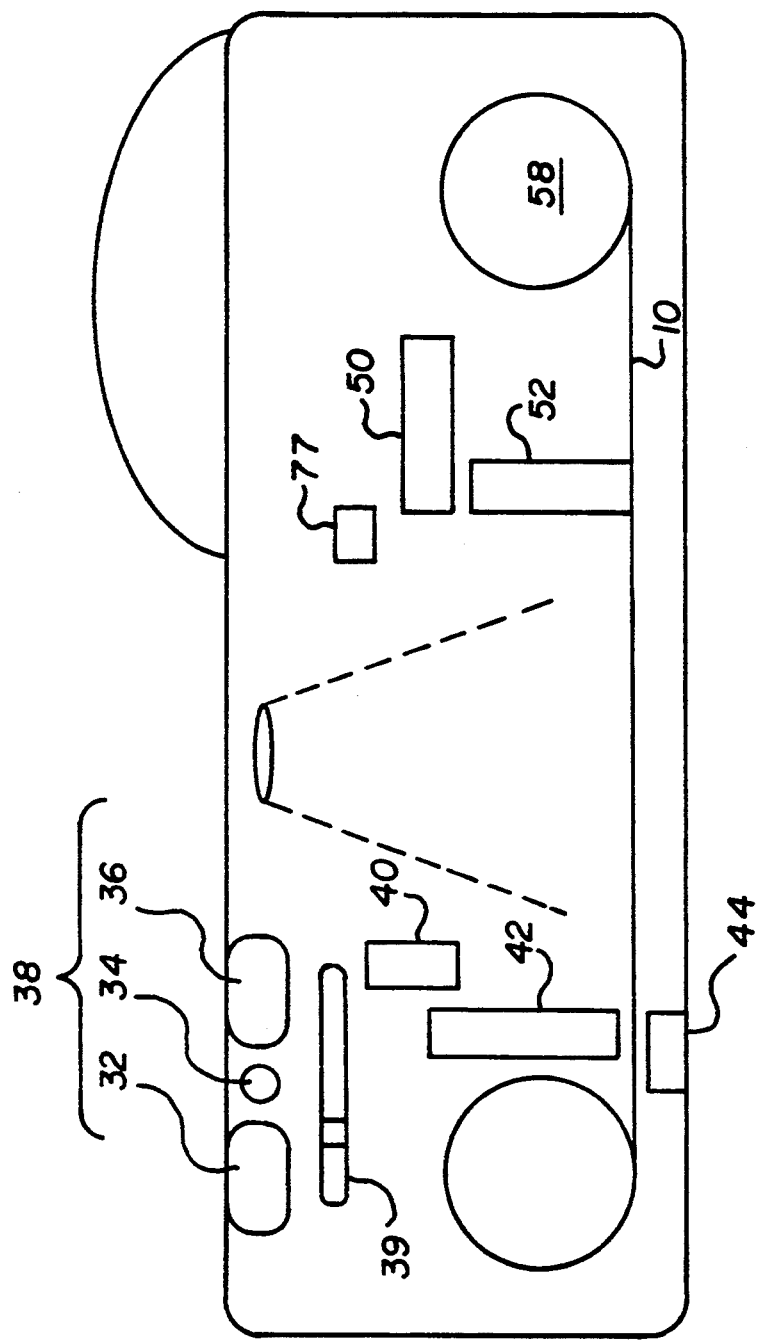
FIG. 1 is a top view of a camera in accordance with the present invention.

With reference to FIG. 4, region 18 of photographic film strip 10 typically exposed in accordance with this invention is shown to contain a conventional photographic image. An image record shown in film cross section region 19 is established in each of the three color sensitive layers 12, 14, and 16 which superimpose to provide full spectral image content as is well known in the photographic art. Region 20 of FIG. 4 has been used in accordance with this invention to store digital data on film strip 10 in color sensitive layers 12, 14, and 16 in response to a particular information source chosen by the user, as shown in cross section in region 21. In the case drawn, the film space taken by this information is equivalent to that occupied by about one and one-half conventional pictures. A particular series of digital data at the beginning 24 and the end 26 of region 20 specifies coding formats and start and termination points of this data, as is commonly practiced in digital data stream transmission. Although the recorded digital information in region 20 is contained in three separate color layers, 12, 14, 16, it is to be recognized that the format for recording and decoding this information in these layers may be accomplished in an arbitrary number of ways. For example, the total digital information content of one line of information recorded in spatially overlapping layers 12, 14, and 16 might be encoded and interpreted as sequential records of information, each record corresponding to the information in one color layer.

Figure 2:
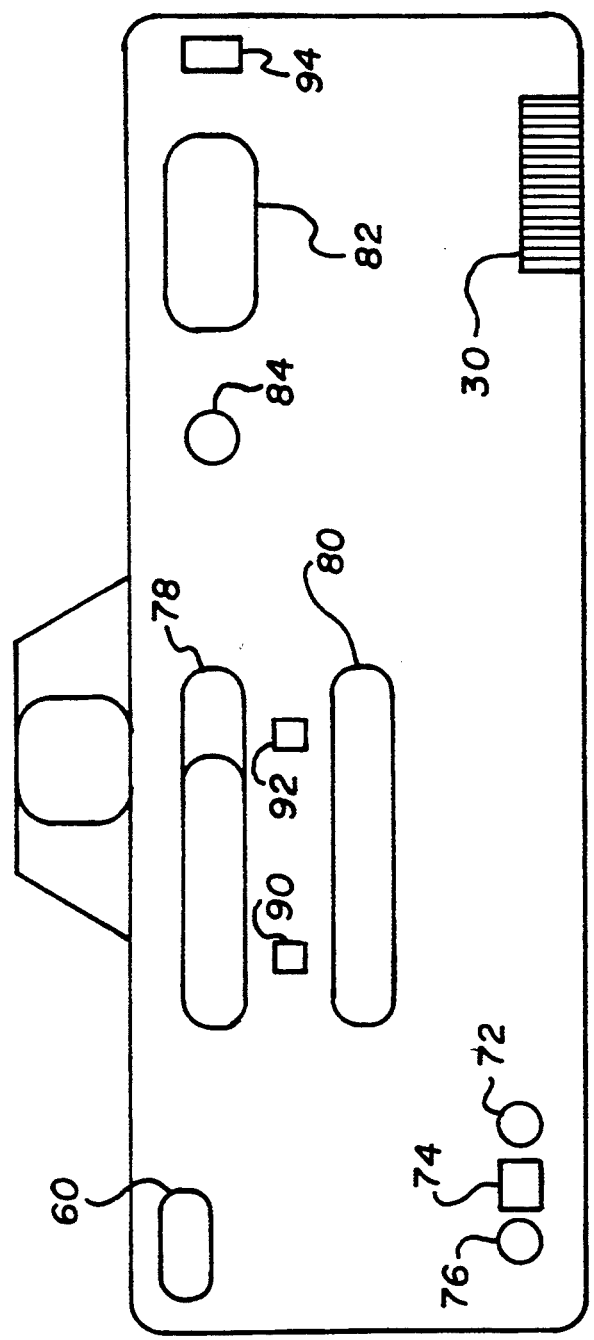
FIG. 2 is a rear view of the camera of FIG. 1.
Figure 5A:
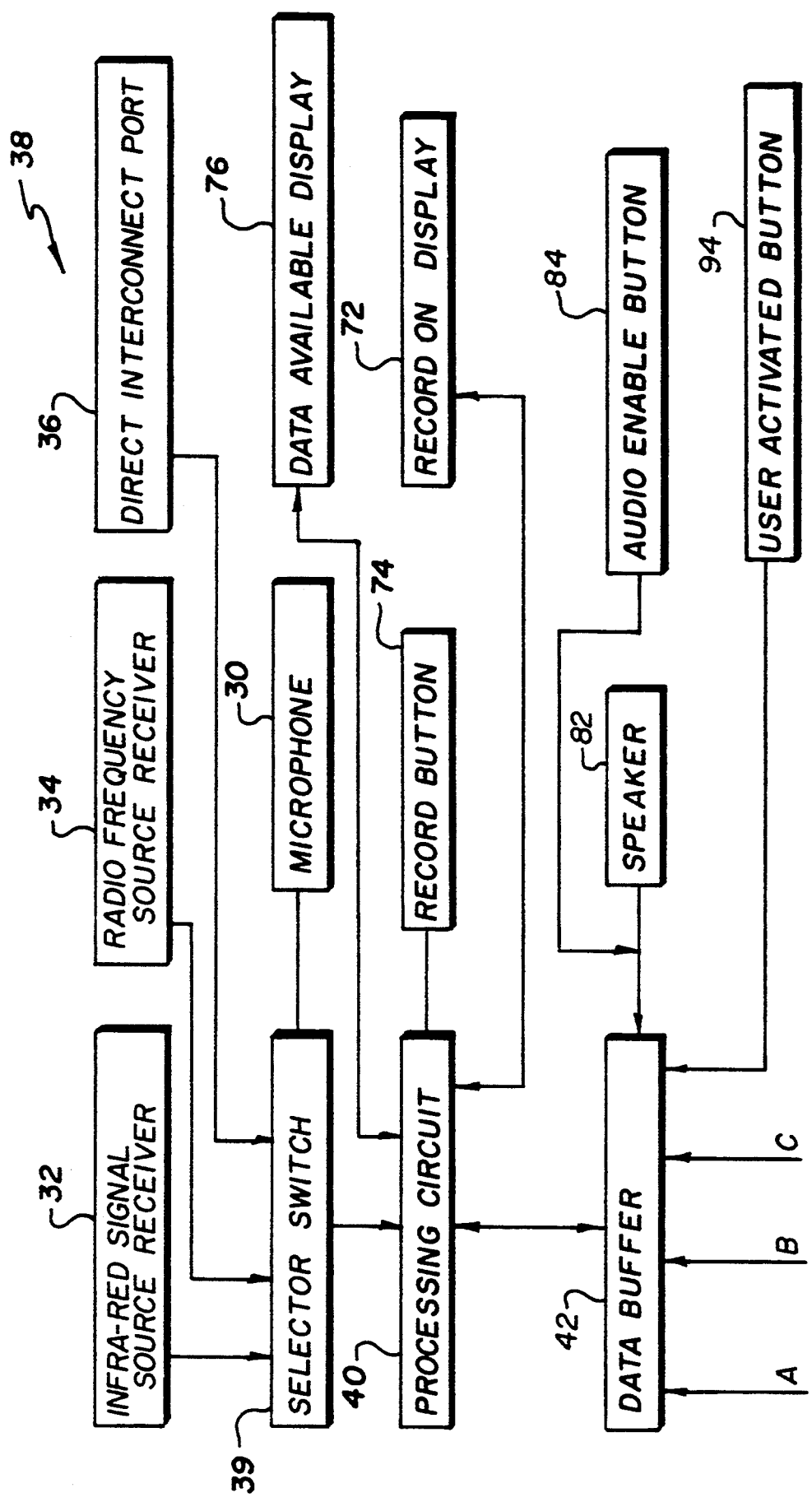
FIG. 5a and 5b show a schematic circuit diagram for operating the camera system of FIGS. 1 and 2.
Figure 5B:
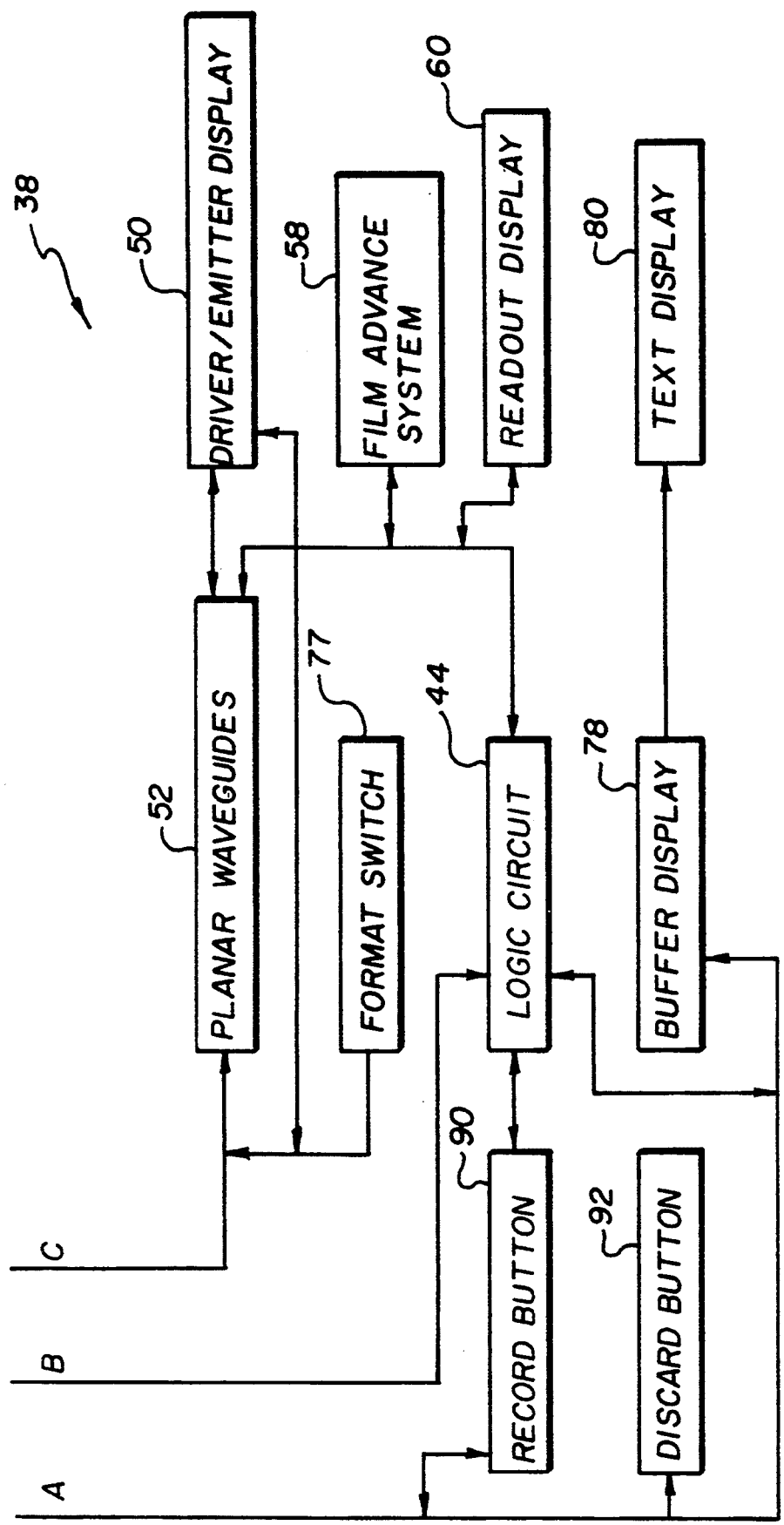

The still camera depicted in top view FIG. 1 and back view FIG. 2 and the circuit diagram of FIG. 5, includes the following capabilities: (i) image capability in the conventional photographic sense, (ii) electronic and optomechanical capability for decoding, storing, and writing information in color digitally on film strip 10, and (iii) receiving capability for acquiring non-pictorial information from a variety of sources. It will be appreciated by those skilled in the art that the digital electronic capabilities can be implemented in many ways using conventional semiconductor components. The interconnection of the various circuits is shown in FIG. 5.

The camera shown in FIGS. 1 and 2 has a microphone 30 for audio recording and communication, circuitry 38 for receiving digital data from at least one external source type, such as an intensity modulated infra-red signal source receiver 32, a radio frequency source receiver 34, or a direct electrical or optical interconnect port 36. The signal from any one of these sources is user selected by a selector switch 39 on the camera, is processed digitally by processing circuit 40, and is stored in a data buffer 42 for subsequent optical encoding on a portion of a film strip 10. The direction of film motion during recording of digital data may be either forward or backward. The data may be recorded anywhere along film strip 10 of FIG. 4 by coordinating film advance and rewind functions with the record film function using electronic logic circuit 44. Electronic logic circuit 44 also ensures that the buffer contents are periodically encoded on the film in a way which can be chosen by format switch 77 not to interfere with the size or quality of any conventional pictures which may be taken at will by the user. For example, digital data might be recorded between pictorial images or in a strip above or below a pictorial image of restricted size. Frame advance automatically occurs after conventional pictures are taken. The periodic transfer of the contents of the partially filled buffer to the film minimally disrupts the option to take pictures and is transparent to the user unless the option to discard the buffer contents before recording is desired.

During the course of recording, the amount of film remaining is displayed on the camera in readout display 60. Data available display 76 indicates whether data from the selected source is available to be recorded as, for example, would be indicated by the presence of a modulated infrared beam in case the infrared mode of capture were selected by switch 39. Record button 74 activates and deactivates recording of digital data, and record on display 72 indicates whether the recording process is activated. It is understood that the timing of the recording sequence may be very different depending on the type of information source selected and thus that the function of record button 74 may differ accordingly. For example, if the user elects to record sound, record button 74 acts as a simple start/stop button. If the source of recorded information is being broadcast repeatedly over a radio channel, on the other hand, then record button 74 may activate a waiting mode in which recording begins only at the start of the broadcast and terminates automatically upon repeat of the broadcast or manually upon deactivation of the record mode. Likewise, the precise sequence of data buffering may depend on the information source selected. Buffer display 78 displays the percentage of buffer memory used, when the total information exceeds the buffer capacity, the buffer contents or a part thereof are automatically written to the film. If, however, the information recorded at the end of recording does not exceed the buffer capacity, buffer display 78 so indicates, enabling the user to verify the validity of the data by text display 80 (for textual information) or by speaker 82 (for audio information) before either enabling the recording sequence on film using record button 90 or discarding the buffered information using discard button 92. Audio enable button 84 enables the audio verification process. The features described provide a still camera system with enhanced capability. It is understood that other means of controlling the flow of information including user configured sequences of operations also comprise such a system.

Digital information generated within the camera may also be optionally recorded on the film strip 10, either in association with particular frames of conventional images or with segments of nonpictorial information. For example, with reference to FIGS. 2 and 5, user activated button 94 causes data and time information to be recorded digitally in association with the information most recently acquired. It is also a preferred embodiment that certain information generated in the camera be recorded digitally on film automatically and without user activation, for example the date and time of conventional image and non-pictorial information recorded, data relating to camera settings, and data relating to camera system measurables, such as scene luminance, etc. which may be of use in subsequent documentation, filing, and display. Data recording may be accomplished during forward or reverse (rewind) directions of film motion.

Optical recording of the information selected onto conventional film in the camera of FIGS. 1 and 2 in the form of an array of spatially separated dots shown in FIG. 4 may be accomplished by a variety of means. In the particular embodiment shown in FIG. 3, recording is accomplished by recording module 54 comprising a high density array of planar wave guides 52 fabricated by means practiced commonly in the art, such as ion diffusion in glass, in end contact with the front surface of the film 10 in proximity to the camera exposure gate 41. The waveguides convey light from an array 53 of gallium arsenide phosphide light emitters whose intensities are individually controlled by module 50 comprising semiconductor driver circuit 51 connected by wirebonds 55 to light emitting array 53, in response to the information received and which is to be recorded as selected by selector switch 39 of FIG. 1. Support 57 provides mechanical integrity for recording module 54. As is known in the art, alternative means of modulating the light emitters, such as optical switches in the light guides, may also serve the purpose of optical exposure. In the preferred embodiment the individual light emitters of light emitting array 53 may be controlled by driver 51 to emit at any one of several intensities of light causing gray scale information to be recorded in each spatially isolated dot. Logic circuit 44 of FIG. 5 ensures that activation of the emitters is synchronized with the film advance system 58 so that the individual bits of information recorded on the film are spaced from one another to produce a two-dimensional array of recorded "dots" to be described. The logic circuit 44 preferentially controls the rate of film advance during digital recording so that film motion is slower and more precise during recording than during frame advance.

This procedure ensures that the digital data is recorded in as small a space as possible.

The light array emitters 53 preferably form a line array with spacing preferably in the range 2 to 200 microns and emitting over only a narrow visible spectral range, for example over a range of ±20 nm. A multiplicity of recording modules 154 similar to recording module 54 but emitting in other spectral ranges are positioned so as to record additional information on the film which may lie in the same spatial region as that recorded by the first array but preferentially sensitizing different layers of the film due to their spectral separation. Such a multiplicity of emitter modules may preferably be comprised of organic electroluminescent devices emitting in the red, green, and blue portions of the spectrum which are deposited directly on waveguide arrays with deposition techniques well known in the art. It is to be recognized by those familiar with film exposure that arrangements other than spatially separated line arrays may be employed to record digital information in each of the film color layers, for example tunable emitters or colinear laser arrays could be employed to this end.

Figure 6:
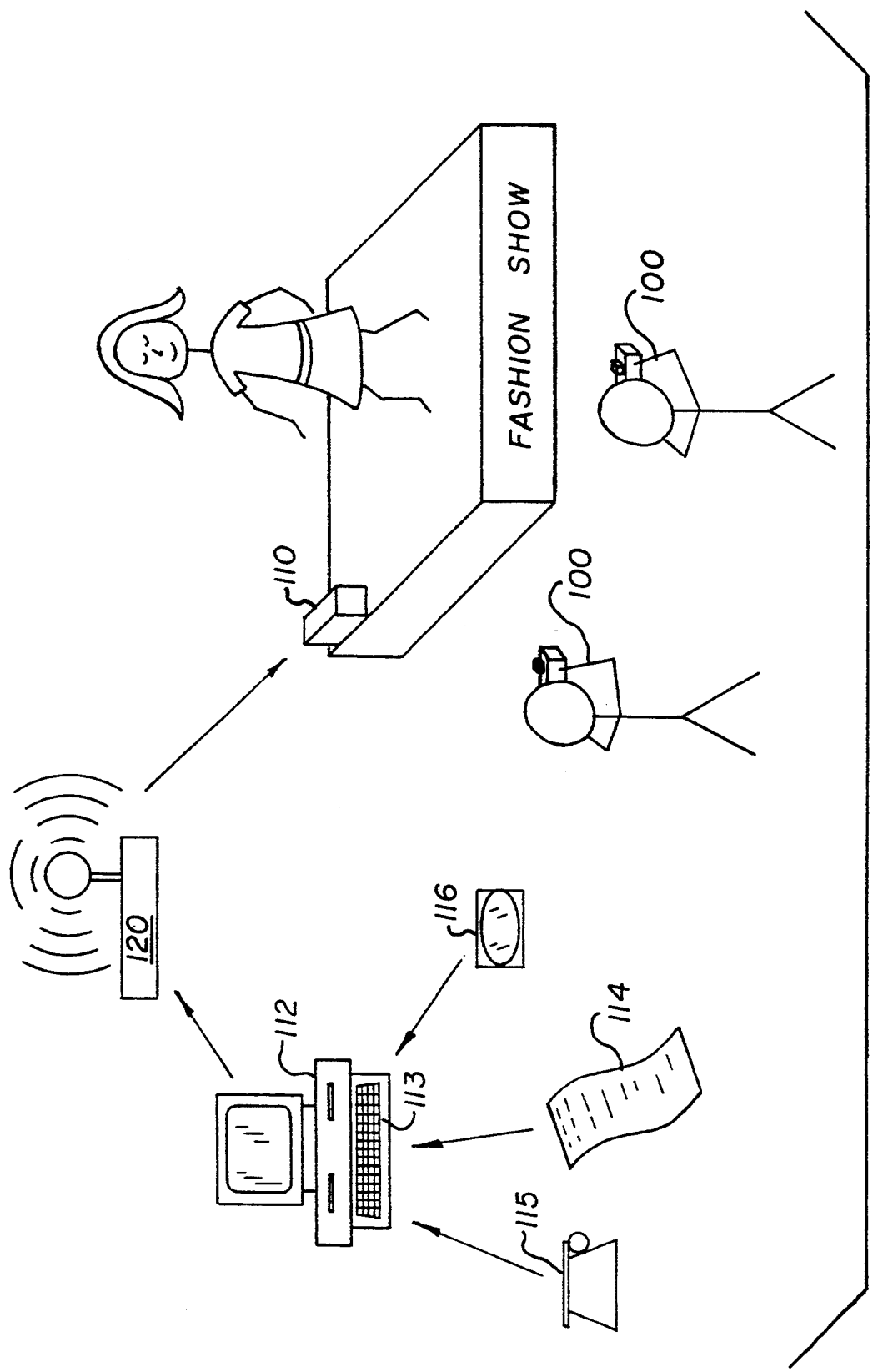
FIG. 6 schematically shows an arrangement for providing non-pictorial input signals to the camera system of FIG. 1 with the information transmitter 110 broken apart.

Turning now to FIG. 6, several still cameras 100 with enhanced features as disclosed previously in accordance with this invention are shown in proximity to information transmitter 110 which is capable of receiving information from external sources and of processing and transmitting this information or modifications of this information to cameras 100. In the preferred embodiment of this concept, information transmitter 110 may include a computer 112 into which information in the form of tables, charts, or text 114 may be input by typing on keyboard 113 or by a remote data link such as modem 115 or by transportable disk 116 and which can process and store information into binary data for local transmission by means of modulated infrared source 120 whose range of transmission extends at least to the position of still cameras 100. Information transmitter 110 may be entirely separate from the cameras and is typically programmed and operated by persons other than camera users.

In the preferred embodiment, the information transmission channel is a modulated infra-red beam which may be aimed toward intended receivers or which may be aimed divergently or adjusted to scatter from selected surfaces such as walls in order to cover a broad area where many users of cameras made in accordance with this invention are likely to be found. As is well known, digital information may also be transmitted by means other than infra-red beams, for example by short range radio frequency or ultrasonic means or by plug-in cable.

In the preferred embodiment for transmission of text, the stream of digital information is broadcast repeatedly in cycles with a standard "start" format code at the beginning of the data stream and a standard format "stop" code at the end for the purpose of enabling cameras 100 to automatically record a single cycle of digital information. The data stream broadcast from modulated infrared source 120 preferably contains periodic patterns of digital bits in addition to start and stop codes which serve to alert the camera to the presence of data available for recording through data available display 76. In a second embodiment, identifying line descriptors are transmitted with associated digital information segments. In a third embodiment, the data stream is divided into subsections with headers which specify the importance, type, or hierarchy of detail in the subsection next to be transmitted in order to optionally allow the receiving cameras to record only that information of a selected importance or type.

It is to be appreciated that other modes of automatic data acquisition may be desirable and logic circuits may be optionally placed on still camera 100 to allow users to program the mode of recording desired. For example, the user of the camera system disclosed might choose to set his camera to automatically receive and record all available data being transmitted at a particular location at a certain level of detail up to a certain time per location provided one or more pictures were taken.

A mode of operation of the camera system may be illustrated by reference to FIG. 6. Let us assume the camera user is attending a fashion show. The user first elects to document the name and location of the fashion show by a brief audio recording, pressing the record button 74 of FIG. 2 after selecting the voice option using selector switch 39 on still cameras 100. Because the audio information is brief, the electronic buffer in the camera does not entirely fill and the user chooses to hear the voice recording using verification button 94 before allowing it to be recorded on film. The user elects to digitally encode the time and date as well using button 94. As the announcer at the fashion show begins to introduce the models, the camera user chooses to record this event as a mixture of conventional images and an extended amount of audio information. He proceeds to record several minutes of the announcer's voice. Because this amount of information exceeds the buffer capacity, segments of the audio are periodically transferred from the electronic buffer to the film. This process repeats, controlled by camera logic circuit 44, until the non-pictorial information acquisition is ceased by the camera user by pressing record button 74. Interspersed with this extended audio recording, the user takes several conventional pictures of the models. Logic circuitry 44 in the camera automatically advances the film at the correct pace so .that pictorial and non-pictorial data do not overlap and yet no film space is wasted.

The only non-pictorial information the user has thus far recorded is audio. The user next desires to acquire textual information and waits for it to become available. This occurs at some point in the fashion show when the announcer signals that information on colors, pricing, and inventory levels of the merchandise being advertised is being transmitted throughout the room in digital form. The user is equally apprised of the availability of information by the data available display 76 on the camera. Since the user's camera is designed to receive these signals, he elects to receive information on colors, pricing, and inventory levels by selecting the infrared receiving mode using selector switch 39 and then pressing record button 74 on his camera which enables circuitry to record the infrared pulses. Recording in the preferred embodiment begins only when a standard "start" format code is received, and is terminated when a standard format "stop" code is received. In a second embodiment, line numbers are associated with information segments and recording proceeds at the first line number transmission and terminates at repeat of this line number.

During the course of text recording, logic circuitry 44 monitors the amount of film remaining and informs the user on readout display 60 of the number of available pictures remaining to be taken. Periodic transfer of the contents of the buffer to the film does not interrupt the non-pictorial recording capability and is transparent to the user save for the display update of the remaining picture space available. In this example, the user has maximized the amount of non-pictorial information desired to be recorded without degrading image size or quality of conventional pictures.

The invention has been described in detail with particular reference to certain preferred embodiments thereof, but it will be understood that variations and modifications can be effected within the spirit and scope of the invention.

PARTS LIST 10 film strip
12 top color sensitive layer
14 middle color sensitive layer
16 bottom color sensitive layer
18 conventional image region
19 cross section region
20 digital data region
21 cross-section region
24 digital data
26 digital data
30 microphone
32 infra-red signal source receiver
34 radio frequency source receiver
36 direct interconnect port
38 communication circuitry
39 selector switch
40 processing circuit
41 exposure gate
42 data buffer
44 logic circuit
50 driver/emitter array
51 driver circuit
52 planar waveguides
53 light emitting array
54 recording module
55 wirebonds
57 support
58 film advance system
60 readout display
72 record on display
74 record button
76 data available display
77 format switch
Parts List Continued
78 buffer display
80 text display
82 speaker
84 audio enable button
90 record button
92 discard button
94 user activated button
100 still cameras
110 information transmitter
112 computer
113 keyboard
114 text
115 modem
116 transportable disk
120 modulated infrared source
154 recording modules
We claim:

1. In a photographic camera system for recording images of a subject in a first location on a photographic film, the improvement comprising:
   a) means for advancing the film;
   b) optical recording means disposed in proximity to the camera exposure gate including a plurality of selectively activated LEDs and waveguide means for conducting light from the emitters to the film as the film is advanced by the film advancing means so that digital information such as digital audio information is recorded in a second location on the film spaced from the first location;
   c) means for optically projecting an image of a subject onto the film to record such image in the first location; and
   d) means for selectively energizing the LEDs at different light levels to provide multilevel gray scale information recorded on the film.

2. The invention of claim 1 further including means for indicating the amount of film used for digital and pictorial recording.

3. The invention of claim 1 wherein the light emitters are gallium arsenide phosphide LEDs and the waveguide means includes diffused glass.

4. The invention of claim 1 wherein the light emitters are organic electroluminescent devices deposited on waveguide arrays.

5. The invention of claim 1 in which the lines of digital information is synchronized with the speed of the film advance means.

6. The invention of claim 1 wherein the recording of digital information occurs during rewind as well as advance direction of film mot ion.

7. The invention of claim 1 further including means of synchronizing recording of digital data with motion of the film during the recording process.

8. The camera of claim 1 further including means for storing digital information and means responsive to such stored information for selectively activating the light emitters, means for buffering and for verifying the integrity of the digital information selectively recorded by the activated light emitters prior to recording.

9. The camera of claim 3 wherein a multiplicity of light emitters, at least some of which produce light of different colors of the visible spectrum, selectively provide spatially overlapping multilevel digital information.

10. The invention of claim 1 further including a source or sources of digital information spaced from the camera and means in the camera for selecting, acquiring, and storing digital information from such source or sources.

11. The invention of claim 10 further including user selectable format for choosing the location of the recorded digital data on the film relative to pictures including a choice of recording format which does not interfere with or degrade the pictorial images.

12. The invention of claim 11 in which the recorded digital data may lie in a strip above and/or below the pictorial images which images are restricted in size.

13. The invention of claim 11 in which the recorded data lies in the area normally occupied by pictures.

14. The invention of claim 11 in which the recorded data lies between frames of pictorial data.

15. The invention of claim 10 further including camera means of notifying the user of the availability of data being transmitted from sources spaced from the camera.

16. The system of claim 10 wherein the retrieved digital information corresponds to textual information which is visually displayed.

17. The system of claim 10 wherein the retrieved digital information corresponds to audio information which is displayed along with the displayed visual image.

18. In a photographic camera system for recording images of a subject in a first location on a photographic film, the improvement comprising:
   a) means for advancing the film;
   b) optical recording means disposed in proximity to the camera exposure gate including a plurality of selectively activated gallium arsenide phosphide LEDs and waveguide means including diffused glass for conducting light from the emitters to the film as the film is advanced by the film advancing means so that digital information such as digital audio information is recorded in a second location on the film spaced from the first location;
   c) means for optically projecting an image of a subject onto he film to record such image in the first location; and
   d) at least some of the LEDs produce light of different colors of he visible spectrum to selectively provide spatially overlapping multilevel digital information.

* * * * *